United States Patent [19]

Duffin et al.

[11] E Patent Number: Re. 33,624

[45] Reissued Date of Patent: Jul. 2, 1991

[54] BATH WITH A VERTICALLY MOVABLE SEAT

[76] Inventors: Richard W. Duffin, Brandon House, Potterne Road, Deuizes, Wiltshire, England, SN10 5DA; David L. Hiscock, Cherville House, Church Road, Romsey, Hampshire, England, S051 8EY

[21] Appl. No.: 444,284

[22] Filed: Dec. 1, 1989

Related U.S. Patent Documents

Reissue of:

[64] Patent No.: 4,726,081
Issued: Feb. 23, 1988
Appl. No.: 828,306
Filed: May 10, 1985

[51] Int. Cl.[5] ..... A47K 3/12

[52] U.S. Cl. ..... 4/564; 4/560; 4/565; 4/566

[58] Field of Search ..... 4/560, 561–566, 4/661

[56] References Cited

U.S. PATENT DOCUMENTS

| | | | |
|---|---|---|---|
| 3,071,779 | 1/1963 | Turner | 4/562 |
| 3,078,475 | 2/1963 | Turner | 4/562 |
| 3,457,569 | 7/1969 | Von Ardenne et al. | 4/561 |
| 4,291,422 | 9/1981 | Shoemaker et al. | 4/563 |
| 4,624,019 | 11/1986 | Pennington-Richards | 4/562 |

*Primary Examiner*—Henry K. Artis
*Attorney, Agent, or Firm*—Edmund M. Jaskiewicz

[57] ABSTRACT

A bath for use by a physically handicapped or physically impaired person, comprising a bath structure (11), a seat (13) located within the bath structure (11), said seat (13) being connected to a seat support (16), said seat support (16) being connected to a mechanical linkage (19) located externally of the bath structure (11), and means (29) for pivoting the linkage (19) in order to move the seat (13) between an upper position in which it is located at or above the upper edge of the sides of the bath structure (11) and a lower position in which the seat (13) is located at the bottom of the bath structure.

20 Claims, 2 Drawing Sheets

BATH WITH A VERTICALLY MOVABLE SEAT

Matter enclosed in heavy brackets [ ] appears in the original patent but forms no part of this reissue specification; matter printed in italics indicates the additions made by reissue.

This invention relates to a bath for use by a physically handicapped or physically impaired person.

BACKGROUND

It is known to provide in a conventional bath a free standing seat structure provided with pneumatically operated means which can move the seat between a vertically raised position, in which the seat is located at the upper edge of the sides of the bath, and a lowered position in which the seat is located near to the bottom of the bath. The disadvantages of such a seat structure are that the seat is free standing and may inadvertently be moved along the bath accidentally. The flexible conduits for conveying the compressed air to the seat extend into the bath and can become bent or deformed so as to cut off the supply of compressed air to the seat. The seat cannot be pivoted so as to lie transversely of the bath and therefore a disabled person may experience difficulty in being able to move onto and off the seat.

SUMMARY OF THE INVENTION

According to the present invention there is provided a bath for use by a physically handicapped or physically impaired person, comprising a bath structure, a seat located within the bath structure, and seat being connected to a seat support, said seat support being connected to a mechanical linkage located externally of the bath structure, and means for pivoting the linkage in order to move the seat between an upper position in which it is located at or above the upper edge of the sides of the bath structure and a lower position in which the seat is located at the bottom of the bath structure.

Preferably the seat is pivotably connected to the seat support so that when the seat is in the upper position, it can be pivoted to lie transversely of the bath structure.

The seat support preferably extends through an opening provided in the bath structure, said opening being sealed by a flexible seal. Preferably the flexible seal is a bellows-like seal member.

The means for pivoting the mechanical linkage preferably comprises a hydraulic jack but it can consist of a pneumatic or electrically operated jack.

BRIEF DESCRIPTION OF THE DRAWINGS

An embodiment of the invention will now be described, by way of an example, with reference to the accompanying drawings, in which.

DETAIL DESCRIPTION

Figure 1:
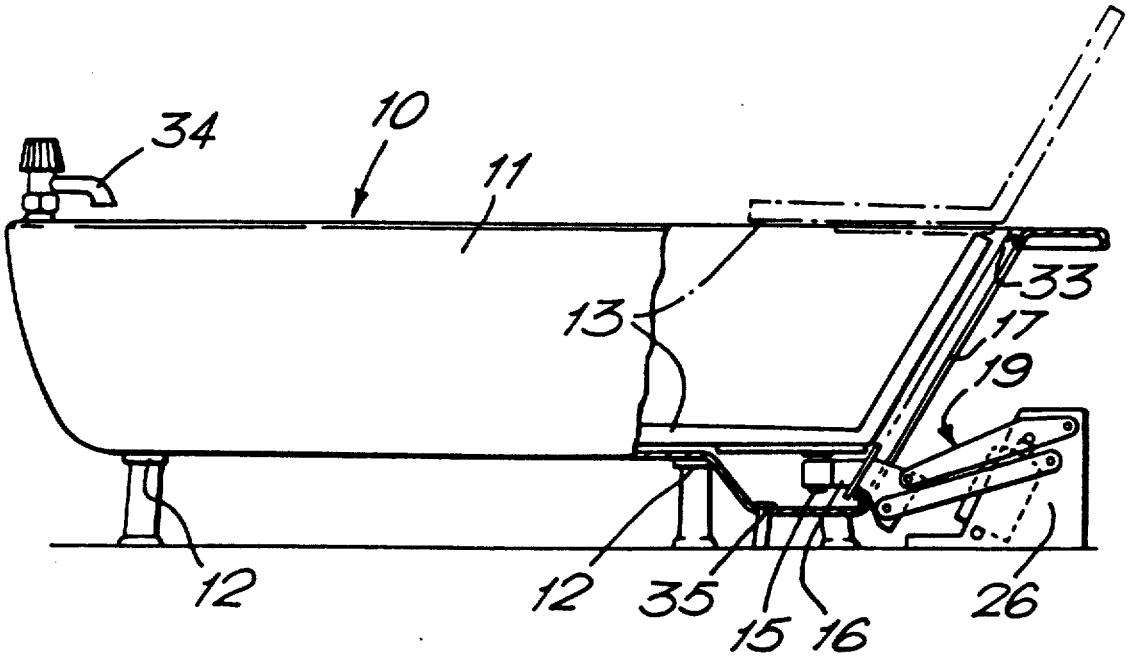
FIG. 1 is a diagrammatic side elevation of a bath according to the present invention, partly in section to show the seat structure.

The bath is generally indicated at 10 and comprises a bath structure 11 preferably moulded from a thermoplastics material or a fibre reinforced plastics material. The bath structure 11 is supported from the floor by a support structure 12.

Located within the bath structure 10 is a seat 13 which is connected to a base support 14 which is provided with a pivot 15 connected to a support member 16. The support member 16 extends through an opening 17 provided in the rear wall 18 of the bath structure 10 and is connected to a parallel linkage generally indicated at 19. The linkage 19 has links 20 and 21 which are pivotably connected to the support member 16 at 22 and 23, respectively, and the links 20 and 21 are pivotably connected at 24 and 25, respectively, to fixed structure 26. It will be appreciated that in order to provide stability there are two links 20 and two links 21. Extending between the links 20 is a member 27 which is contacted by the piston rod 28 of a hydraulic jack 29 which is pivotably connected at 30 to the structure 26.

Figure 2:
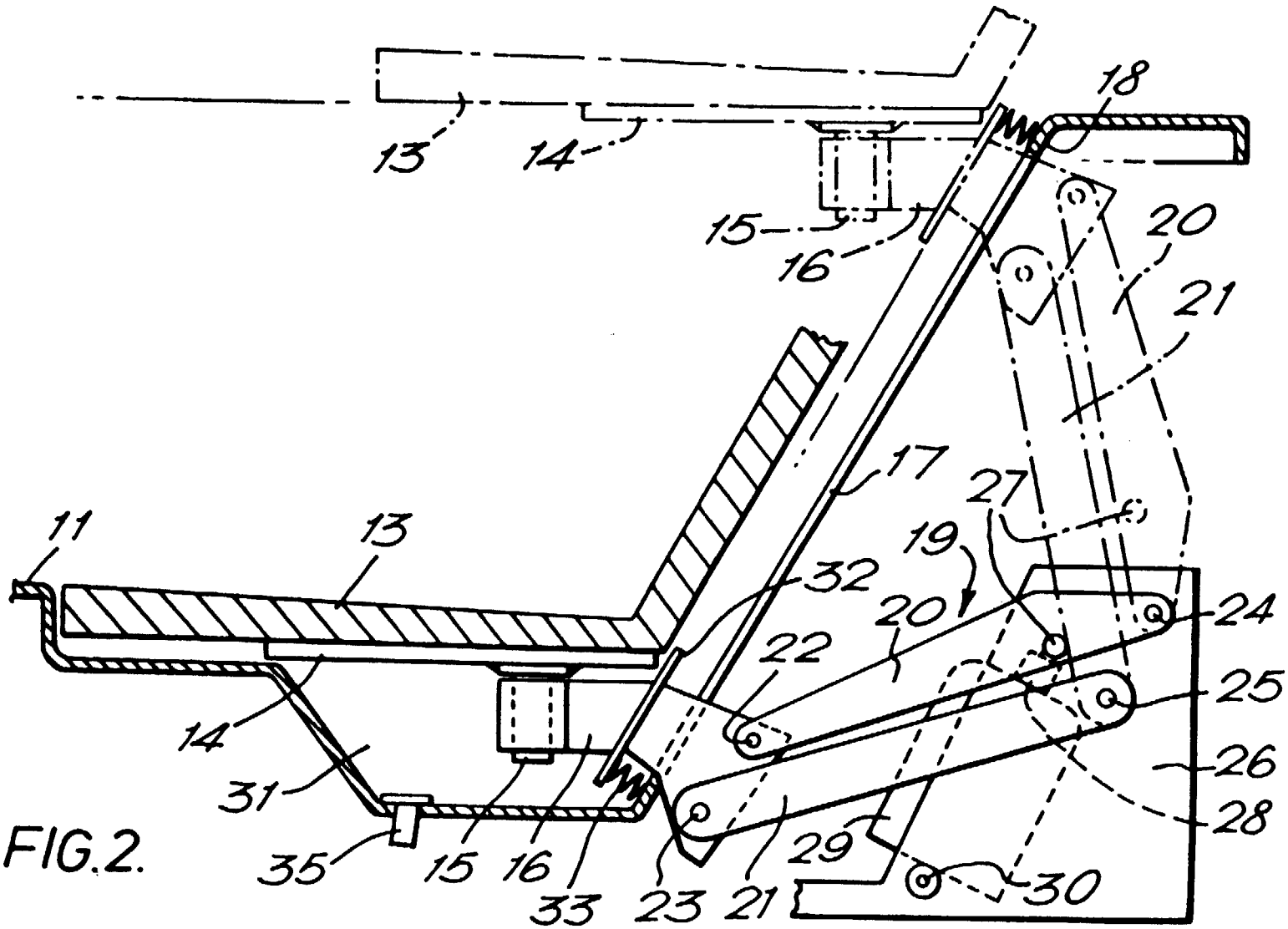
FIG. 2 is an enlarged section showing the seat structure and operating linkage in greater detail.

The bottom of the bath structure 11 is provided with a well or recess 32 in which the bottom of the seat 13 and the support 14, pivot 15 and support member 16 are received when the seat 13 is in its lowered position as indicated in full lines in FIG. 2. FIG. 2 shows the seat 13 in the raised position in broken lines.

The support member 16 is provided with a flange 32 which is connected to a bellows type sealing member 33 which is secured to the rear wall 18 around the opening 17 in order to seal the opening 17.

By operating the jack 29, the linkage 19 is caused to pivot upwardly thus raising the seat 13 to a position in which it is located just above the upper edge of the sides of the bath structure 11 where it can be moved about the pivot 15 so as to lie transversely of the bath structure 11. In this position a physically disabled or physically impaired person can move onto and off the seat 13. When a person has moved onto the seat 13, it is moved about the pivot 15 to lie fore and aft of the bath structure 11 and the hydraulic pressure in the jack 29 released to cause the linkage 19 to swing downwardly and thus lower the seat to the full line position shown in FIG. 2.

Preferably the linkage 19 is arranged so that the seat 13 tilts slightly downwardly at its front end when in the raised position and tilts slightly downwardly at its rear end when in the lowered position.

The hydraulic fluid of the jack 29 may be oil or water and such water may be taken from the water supply to the taps 34 provided on the bath.

Alternatively, the jack 29 may be a pneumatically operated jack or an electrically operated jack. The operation of the jack 29 may be remotely controlled by control buttons, levers or pull cords.

The bath structure 11 is provided with a waste pipe 35 which may be controlled by a remotely operated plug.

What is claimed is:

1. A bath for use by a physically handicapped or physically impaired person, comprising a bath structure including bottom and side wall means for containing a volume of liquid, a seat movable within the bath structure, means extending through an opening in said wall means for raising and lowering said seat, and means for sealing said opening, said means for raising and lowering including a seat support to which said seat is connected, [a mechanical linkage] *means* connected to said seat support and located externally of said wall means, [and means] for [pivoting said linkage in order to move] *moving* said seat between an upper position in which it is located at or above the upper edge of the sides of the bath structure and a lower position in which said seat is located at the bottom of said bath structure.

2. A bath as set forth in claim 1, including pivot mounting means for pivotally connecting said seat to said seat support so that when said seat is in the upper position it can be pivoted to lie transversely of said bath structure.

3. A bath as set forth in claim 2, wherein said mechanical linkage comprises parallel links pivotally connected at one end to a fixed structure and at their other end to said seat support, and said means for pivoting includes a jack connected between said fixed structure and parallel links.

4. A bath as set forth in claim 3, wherein said jack is pivotally connected at one end to said fixed structure and is connected at its other end to said links at a point spaced from said other end of said links.

5. A bath as set forth in claim 4, wherein said jack is of hydraulic, pneumatic or electrically operated type.

6. A bath as set forth in claim 3, wherein said seat support extends through said opening and said means for sealing includes a flexible seal.

7. A bath as set forth in claim 6, wherein said flexible seal is a bellows-like seal member.

8. A bath as set forth in claim 1, wherein said *means for moving comprises* mechanical linkage [comprises] *having* parallel links pivotally connected at one end to a fixed structure and at their other end to said seat support, and said means for [pivoting] *moving* includes a jack connected between said fixed structure and parallel links.

9. A bath as set forth in claim 8, wherein said jack is pivotally connected at one end to said fixed structure and is connected at its other end to said links at a point spaced from said other end of said links.

10. A bath as set forth in claim 8, wherein said jack is of hydraulic, pneumatic or electrically operated type.

11. A bath as set forth in claim 8, wherein said seat support extends through said opening and said means for sealing includes a flexible seal.

12. A bath as set forth in claim 11, wherein said flexible seal is a bellows-like seal member.

13. A bath as set forth in claim 1, wherein said wall means includes a bottom wall provided with a recess in which the bottom of said seat and said seat support are received when said seat is in said lower position.

14. A bath as set forth in claim 1, wherein said jack is hydraulically operated and includes water as the hydraulic fluid.

15. A bath as set forth in claim 1, wherein said wall means includes an end wall including said opening, and said flexible seal is secured to said end wall around said opening.

16. A bath as set forth in claim 15, wherein said flexible seal is a bellows-like seal member.

17. A bath as set forth in claim 1, wherein said seat support extends through said opening and said means for sealing includes a flexible seal.

18. A bath as set forth in claim 17, wherein said flexible seal is a bellows-like seal member.

*19. A bath as set forth in claim 1 wherein said means for moving is disposed between said upper and lower positions of said seat.*

*20. A bath as set forth in claim 1 wherein said means for moving comprises a mechanical linkage and means for pivoting said mechanical linkage.*

* * * * *